US011858190B2

(12) United States Patent
Maruyama

(10) Patent No.: US 11,858,190 B2
(45) Date of Patent: Jan. 2, 2024

(54) ABNORMALITY DETECTION DEVICE FOR INJECTION MOLDING MACHINE

(71) Applicant: FANUC CORPORATION, Yamanashi (JP)

(72) Inventor: Junpei Maruyama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 1692 days.

(21) Appl. No.: 15/461,799

(22) Filed: Mar. 17, 2017

(65) Prior Publication Data

US 2017/0274572 A1 Sep. 28, 2017

(30) Foreign Application Priority Data

Mar. 25, 2016 (JP) ................. 2016-062292

(51) Int. Cl.
B29C 45/76 (2006.01)

(52) U.S. Cl.
CPC .. B29C 45/768 (2013.01); *B29C 2945/76006* (2013.01); *B29C 2945/7611* (2013.01);
(Continued)

(58) Field of Classification Search
CPC ........ B29C 45/768; B29C 2945/76006; B29C 2945/76033; B29C 2945/76096;
(Continued)

(56) References Cited

U.S. PATENT DOCUMENTS 6,409,495 B1   6/2002 Kamiguchi et al.
6,527,534 B1   3/2003 Kamiguchi et al.
(Continued)

FOREIGN PATENT DOCUMENTS

CN   103057075 A   4/2013
CN   103171108 A   6/2013
(Continued)

OTHER PUBLICATIONS

Office Action for JP Application No. 2016-062292, dated Apr. 24, 2018, 6pp.

*Primary Examiner* — Joseph S Del Sole
*Assistant Examiner* — John Robitaille
(74) *Attorney, Agent, or Firm* — HAUPTMAN HAM, LLP

(57) ABSTRACT

An abnormality detection device includes a servo CPU; a physical quantity detection unit which detects a physical quantity such as a load applied on a servo motor which operates a movable part included in an injection molding machine. The abnormality detection device further includes a first storage unit directly readable/writable by the servo CPU; and a second storage unit not directly readable/writable by the servo CPU. A reference physical quantity is stored in the first and second storage units. The servo CPU outputs an instruction for stopping or decelerating the movable part in response to a first physical quantity deviation, which is a deviation between a reference physical quantity read from the first storage unit and a current physical quantity, or a second physical quantity deviation, which is a deviation between a reference physical quantity read from the second storage unit and a current physical quantity, exceeds a threshold value.

7 Claims, 4 Drawing Sheets

(52) U.S. Cl.
CPC .............. *B29C 2945/76033* (2013.01); *B29C 2945/76096* (2013.01); *B29C 2945/76163* (2013.01); *B29C 2945/76214* (2013.01); *B29C 2945/76692* (2013.01)

(58) Field of Classification Search
CPC ... B29C 2945/7611; B29C 2945/76163; B29C 2945/76214; B29C 2945/76692
See application file for complete search history.

(56) References Cited

U.S. PATENT DOCUMENTS

| | | | |
|---|---|---|---|
| 2004/0044434 A1* | 3/2004 | Morimura | ............... B29C 45/76 700/197 |
| 2013/0095200 A1 | 4/2013 | Maruyama et al. | |
| 2013/0156875 A1 | 6/2013 | Maruyama et al. | |

FOREIGN PATENT DOCUMENTS

| | | |
|---|---|---|
| DE | 102012018748 A1 | 4/2013 |
| JP | H5-192969 A | 8/1993 |
| JP | H9-85792 A | 3/1997 |
| JP | 3080617 B1 | 8/2000 |
| JP | 2001038775 A | 2/2001 |

\* cited by examiner

ABNORMALITY DETECTION DEVICE FOR INJECTION MOLDING MACHINE

RELATED APPLICATIONS

The present application claims Priority to Japanese Patent Application Number 2016-062292, filed Mar. 25, 2016, the disclosure of which is hereby incorporated by reference herein in its entirety.

BACKGROUND OF THE INVENTION

1. Field of the Invention

The present invention relates to an injection molding machine and especially relates to an abnormality detection device for injection molding machine.

2. Description of the Related Art

In a mold opening/closing operation or in a molded article ejection operation in an injection molding cycle for manufacturing a molded article by using an injection molding machine, a load of a motor which drives a movable part is preliminarily stored as a reference load in a manner to be associated with time or a position of the movable part. Further, the stored reference load and an actual motor load are sequentially compared to each other in a manner to be associated with time or a position of the movable part so as to detect abnormality in the mold opening/closing operation or in the ejection operation depending on whether or not the deviation obtained through the comparison exceeds a preset threshold value. In the case where the deviation exceeds the preset threshold value, that is, in the case where abnormality is detected, the injection molding machine is instantaneously stopped, thus preventing a damage on a mechanism part or a mold.

For example, Japanese Patent Application Laid-Open No. 2001-030326 and Japanese Patent Application Laid-Open No. 2001-038775 disclose the above-described abnormality detection technique for damage prevention in which a load of at least one operation among the past normal operations of the mold opening/closing operation or the ejection operation or a load obtained by calculating a movement average value of a plurality of times of operations is set as a reference load.

However, the technique disclosed in Japanese Patent Application Laid-Open No. 2001-030326 and Japanese Patent Application Laid-Open No. 2001-038775 described in the background art has the following problem. In the technique disclosed in Japanese Patent Application Laid-Open No. 2001-030326 and Japanese Patent Application Laid-Open No. 2001-038775, when a load of a motor driving a movable part is stored as a reference load, the load is stored in a data storage RAM via a servo CPU. In this case, since the data storage RAM has a large storage capacity, the data storage RAM can store a large volume of reference load. Meanwhile, it is necessary to transfer data from the servo CPU to the data storage RAM, resulting in communication delay in data transfer. In this case, there is a problem in which time lag between an occurrence of abnormality and detection of the abnormality is generated. Further, in the case where a load is stored in a RAM which is directly readable/writable by the servo CPU, communication delay in data transfer is not generated. However, a RAM which is directly readable/writable by a servo CPU has a small storage capacity in general, so that it is hard for the RAM to store a large volume of reference load. Consequently such problem arises that it is hard to monitor the whole process of an operation in the case where a movable part is operated in a long period of time.

SUMMARY OF THE INVENTION

Therefore, the present invention is designed to solve the above-mentioned problems and an object of the present invention is to provide an abnormality detection device for injection molding machine which stores a reference load for abnormality detection in both of a large capacity RAM and a RAM which is directly readable/writable by a servo CPU, so as to be able to monitor the whole process of an operation even in the case where a movable part is operated in a long period of time and be able to shorten time lag between an occurrence of abnormality and detection of the abnormality in the case where a movable part is operated in a relatively short period of time.

An abnormality detection device for injection molding machine according to the present invention includes: a servo CPU; a driving unit which drives and controls a servo motor based on an instruction from the servo CPU so as to drive a movable part; a physical quantity detection unit which detects any one of a load applied on the servo motor, a speed of the servo motor, current flowing in the servo motor, and a position deviation of the servo motor, as a physical quantity; and first and second storage units which store the physical quantity in a manner to associate the physical quantity with elapsed time in an operation of the movable part or a position of the movable part in the operation of the movable part, as a reference physical quantity, and sequentially compares the reference physical quantity which is stored with a physical quantity which is currently detected in a manner to associate the reference physical quantity and the physical quantity which is currently detected with elapsed time in which the movable part operates or an operation position of the movable part so as to detect abnormality in a case where a deviation, which is obtained through the comparison, exceeds a threshold value. The first storage unit is directly readable/writable by the servo CPU, the second storage unit is not directly readable/writable by the servo CPU, and the servo CPU outputs an instruction for stopping or decelerating the movable part in a case where either of a first physical quantity deviation which is a deviation between a reference physical quantity read from the first storage unit and a current physical quantity and a second physical quantity deviation which is a deviation between a reference physical quantity read from the second storage unit and a current physical quantity exceeds a threshold value.

In the abnormality detection device for injection molding machine according to the present invention, the first storage unit has a smaller storage capacity than the second storage unit or takes a higher cost per unit storage capacity than the second storage unit.

In the abnormality detection device for injection molding machine according to the present invention, the first storage unit is an internal RAM of the servo CPU or an external RAM which is connected with the servo CPU by a memory bus.

According to the present invention, an abnormality detection device for injection molding machine can be provided which is capable of monitoring the whole process of an operation even in the case where a movable part is operated in a long period of time and capable of shortening time lag between an occurrence of abnormality and detection of the abnormality in the case where a movable part is operated in a relatively short period of time.

BRIEF DESCRIPTION OF THE DRAWINGS

The above-described and other objects and features of the present invention will be apparent from the following embodiment which is described in reference to the accompanying drawings. Among these drawings.

DETAILED DESCRIPTION OF THE PREFERRED EMBODIMENT

Figure 1:
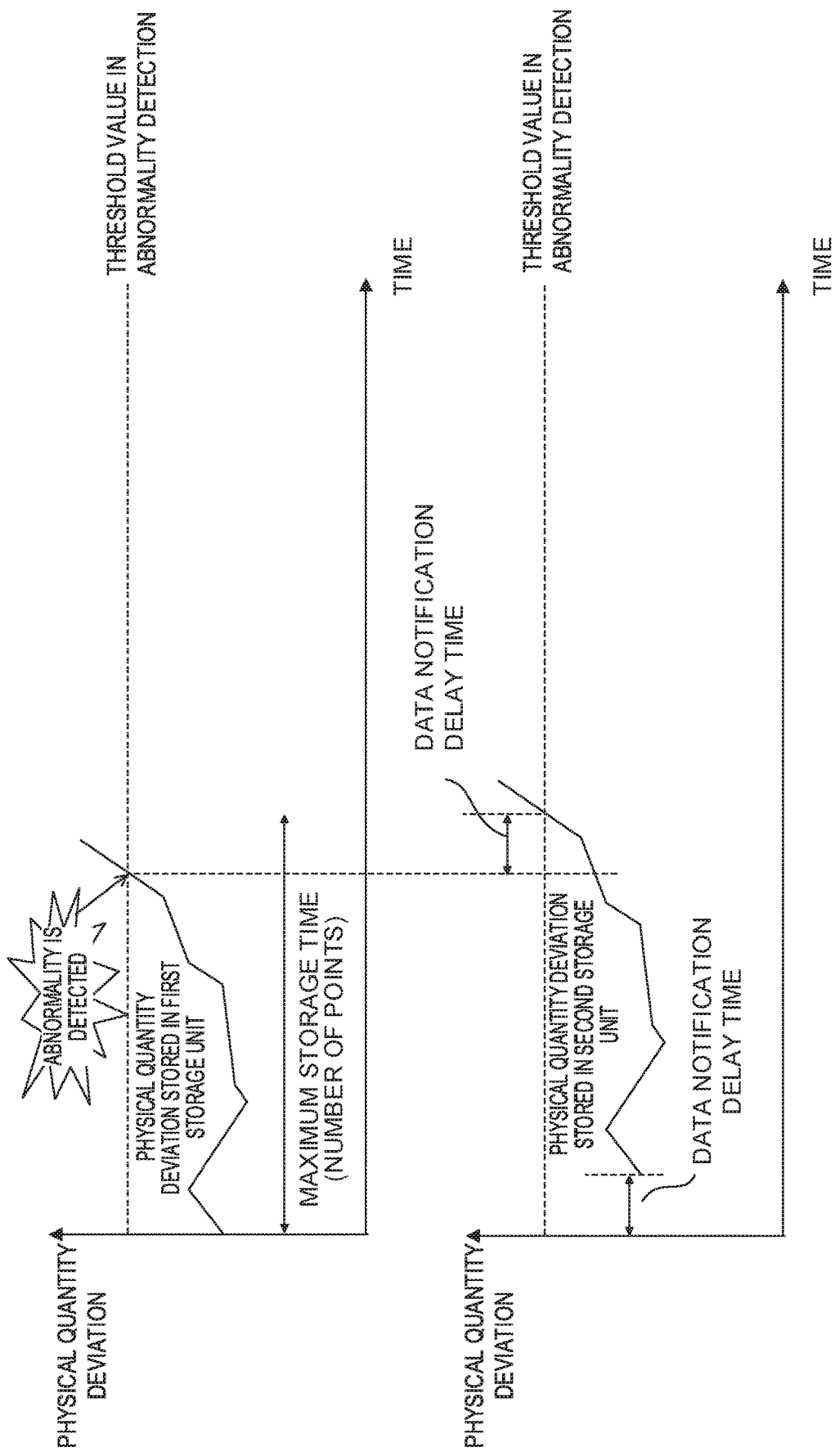
FIG. 1 illustrates reaction time of an abnormality detection device for injection molding machine according to the present invention in the case where operation time of a movable part is short.

An embodiment of the present invention will be described below with reference to the accompanying drawings.

An abnormality detection device for injection molding machine according to the present invention stores a physical quantity (a load applied on a servo motor, a speed of the servo motor, a current value of current for driving the servo motor, and a position deviation of the servo motor), which is obtained when a movable part is driven in a normal state and corresponds to time from driving start time or a position of the movable part, of a servo motor, which drives the movable part, as a reference physical quantity in a RAM which is directly readable/writable by a servo CPU and a RAM which is not directly readable/writable by a servo CPU, so as to detect abnormality of the movable part by using the reference physical quantity which is stored in these two RAMs.

The RAM which is directly readable/writable by a servo CPU is an internal RAM such as a cash memory which is connected with the servo CPU via an internal bus or an external RAM such as a main memory and a shared memory for servo CPU which is connected via an external bus, that is, a RAM which is readable/writable without intervention of a CPU other than the servo CPU. A RAM which is directly readable/writable by a servo CPU may be accessed in sequence while the servo CPU is controlling a servo motor. Therefore, the RAM is required to be able to meet high speed data reading/writing corresponding to the control for the servo motor and thus, it is necessary to use a memory chip whose access speed is relatively high and whose cost per unit storage capacity is relatively high. Accordingly, only the minimum required storage capacity is often mounted in view of the aspect of cost.

On the other hand, the RAM which is not directly readable/writable by a servo CPU is a memory which requires intervention of a CPU other than the servo CPU for reading and writing performed by the servo CPU, that is, a RAM from/to which data cannot be read/written only based on a load instruction or a store instruction which is executed on the servo CPU. When reading/writing of data is performed with respect to such RAM by the servo CPU, the servo CPU exchanges data with another CPU by using a transfer command via an expansion bus or the like and thus, the other CPU with which the servo CPU exchanges data directly reads/writes the data from/to the RAM, generating delay in reading/writing of data.

Examples of the RAM which is not directly readable/writable by a servo CPU include a RAM from/to which reading/writing can be directly performed by a CPU performing numerical control, for example. A RAM which is directly used by a numerical control CPU has a relatively large storage capacity so as to be used for numerical control processing. On the other hand, a memory chip whose cost per unit storage capacity is low is often used as the RAM.

Thus, a physical quantity detected in the past is stored in two types of RAMs, which are a RAM which is directly readable/writable by a servo CPU (referred to below as a first storage unit) and a RAM which is not directly readable/writable by a servo CPU (referred to below as a second storage unit), as a reference physical quantity in a manner to be associated with time from start of an operation of a movable part or with a position coordinate of the movable part so as to detect abnormality of the movable part by using the reference physical quantity. Accordingly abnormality detection processing taking advantage of each of the RAMs can be performed for the case where operation time of the movable part is short and the case where operation time of the movable part is long, as described below.

<Case where Operation Time of Movable Part is Short>

In the case where operation time of a movable part is short, the number of points (the number of sampling points) of reference physical quantities to be stored during an operation is small, so that the RAM capacity required for storing reference physical quantities for abnormality detection is small. In this case, as illustrated in FIG. 1, abnormality detection is performed by using both of the first physical quantity deviation which is calculated based on a current physical quantity detected from the movable part and a reference physical quantity stored in the first storage unit and the second physical quantity deviation which is calculated based on a current physical quantity detected from the movable part and a reference physical quantity stored in the second storage unit. Since the first physical quantity deviation is calculated based on the reference physical quantity stored in the first storage unit, abnormality can be detected with almost no delay from an occurrence of the abnormality in the case of the abnormality detection performed based on the first physical quantity deviation compared to the case of the abnormality detection performed based on the second physical quantity deviation.

<Case where Operation Time of Movable Part is Long>

Figure 2:
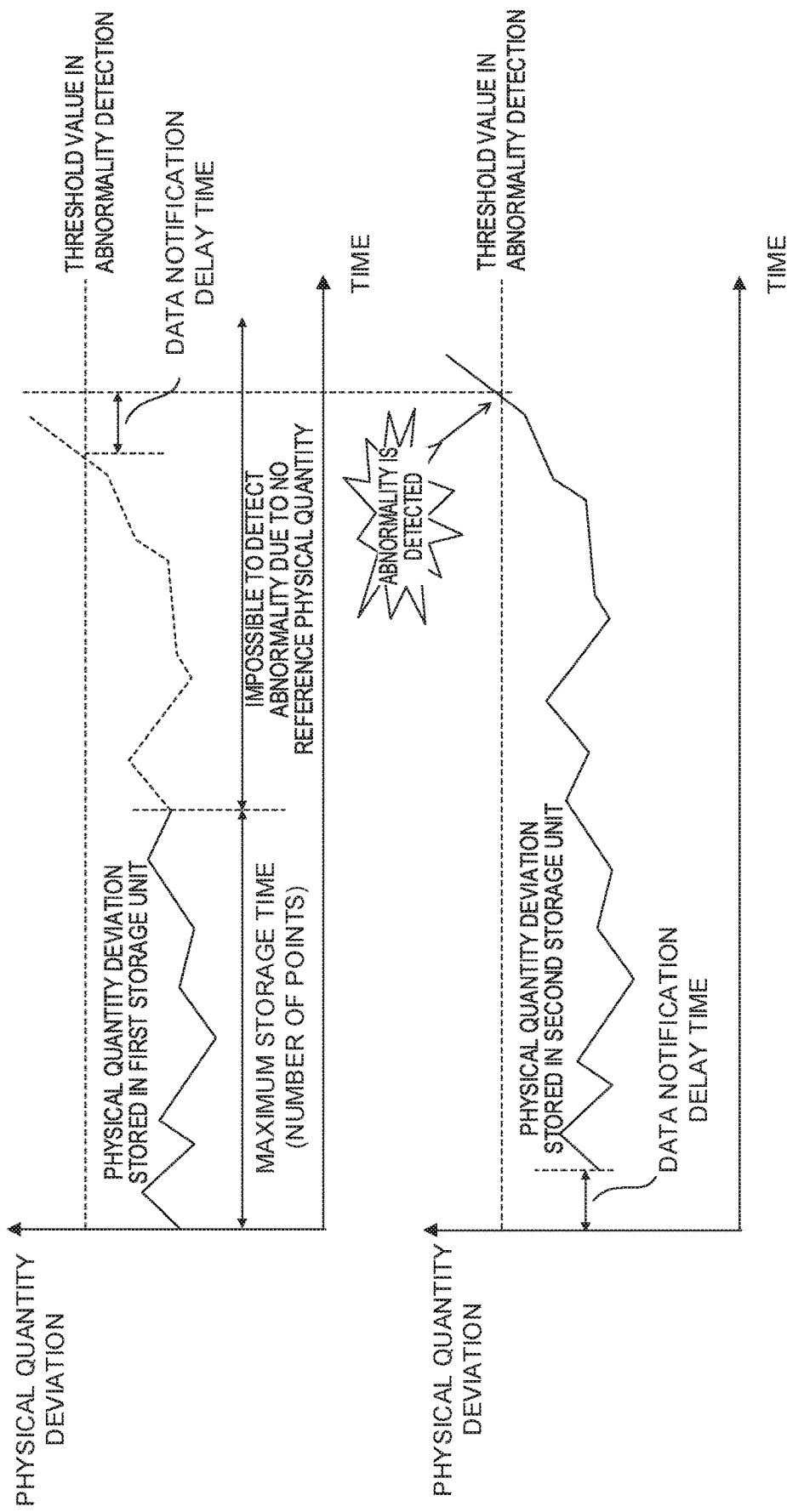
FIG. 2 illustrates reaction time of the abnormality detection device for injection molding machine according to the present invention in the case where operation time of the movable part is long.

In the case where operation time of a movable part is long, the number of points (the number of sampling points) of reference physical quantities to be stored during an operation is large, so that the RAM capacity required for storing reference physical quantities for abnormality detection is large. In this case, as illustrated in FIG. 2, the storage capacity of the first storage unit may be insufficient and abnormality cannot be detected based on the first physical quantity deviation on and after predetermined operation time (the maximum storage time) in this case. However, since the reference physical quantities are stored in the second storage unit as well, abnormality can be detected based on the second physical quantity deviation also on and after the maximum storage time though a certain level of delay is generated.

Figure 3:
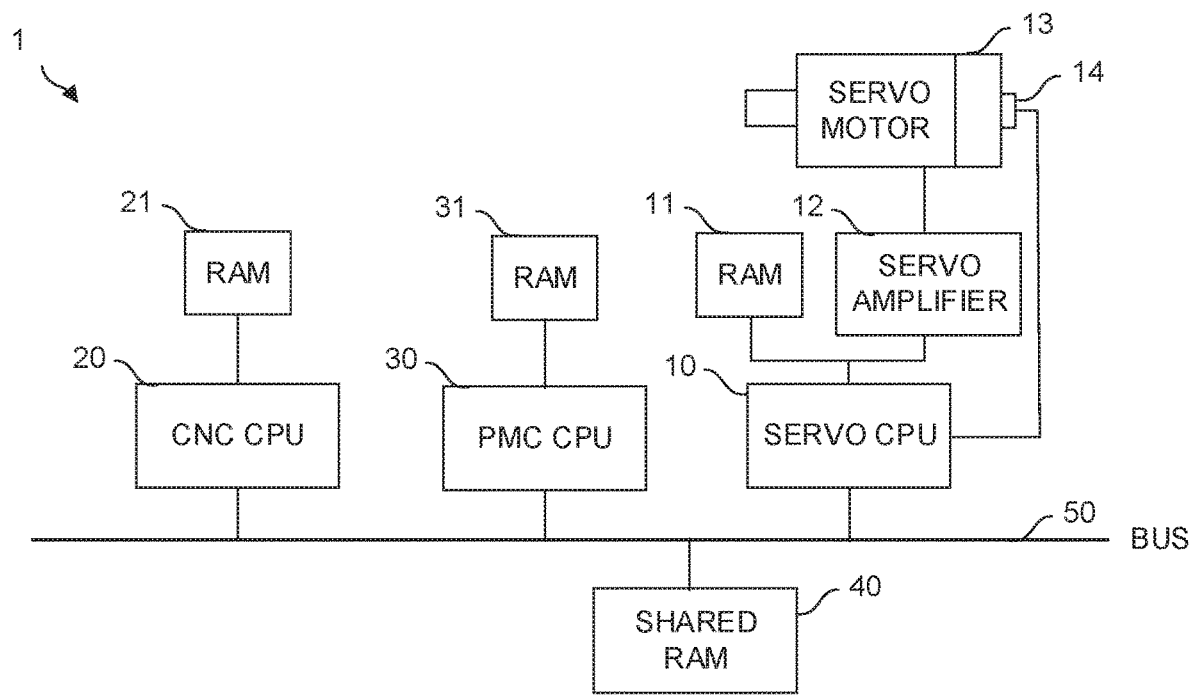
FIG. 3 is a chief part configuration diagram of the abnormality detection device for injection molding machine according to an embodiment of the present invention.

FIG. 3 is a chief part configuration diagram of an abnormality detection device 1 for injection molding machine according to an embodiment of the present invention.

The abnormality detection device 1 includes a servo CPU 10 which is a microprocessor for servo control, a CNC CPU 20 which is a microprocessor for numerical control, a PMC CPU 30 which is a microprocessor for programmable machine controller, and a shared RAM 40 which is directly readable/writable by each of the CPUs. In the abnormality detection device 1, information can be transmitted among the microprocessors by selecting mutual input/output via a bus 50.

To the servo CPU 10, a ROM (not illustrated) in which a control program dedicated for servo control for processing of a position loop, a speed loop, and a current loop is stored and a RAM 11 which is used for temporary storage of data are connected. To the servo CPU 10, a servo amplifier 12 which drives servo motors 13 for respective axes used for mold clamping, for injection, for screw rotation, for ejector, and the like based on instructions from the servo CPU 10 is connected. An output from a position and speed detector 14 attached to the servo motor 13 for each axis is fed back to the servo CPU 10. A current position of each axis is calculated by the servo CPU 10 based on a feedback signal of a position from the position and speed detector 14 so as to be updated and stored in a current position storage register (not illustrated) for each axis.

FIG. 3 shows only the servo motor 13 which drives a mold clamping mechanism and the position and speed detector 14 which is attached to this servo motor 13 and detects a position and the like of a movable mold based on a rotation position of this servo motor 13. However, respective axes for clamping, for injection, for ejector, and the like have the same configurations as this.

Further, to the CNC CPU 20, a ROM (not illustrated) in which an automatic operation program for controlling the whole of an injection molding machine and the like are stored and a RAM 21 which is used for temporary storage of operation data, for example, are connected. To the PMC CPU 30, a ROM (not illustrated) in which a sequence program for controlling a sequence operation of an injection molding machine and the like are stored and a RAM 31 which is used for temporary storage of operation data, for example, are connected.

The shared RAM 40 composed of a nonvolatile memory is a memory which is directly readable/writable by each of the servo CPU 10, the CNC CPU 20, and the PMC CPU 30 and is used as a molding data storage memory storing molding conditions and various types of setting values, which are related to an injection molding operation, parameters, macro variables, and the like.

In the above-described configuration, the PMC CPU 30 controls a sequence operation of the whole of an injection molding machine and the CNC CPU 20 distributes moving instructions to the servo motors 13 of respective axes based on an operation program, a molding condition stored in the shared RAM 40, and the like. Further, the servo CPU 10 performs servo control such as position loop control, speed loop control, and current loop control based on moving instructions distributed to respective axes and feedback signals of a position and a speed which are detected in the position and speed detector 14, as is the case with the prior art, that is, the servo CPU 10 executes digital servo processing.

The above-described configuration is same as that of a control device for injection molding machine of prior art and the abnormality detection device 1 for injection molding machine according to the present invention is composed of this control device. The abnormality detection device 1 is different from a control device of the prior art in that the abnormality detection device 1 stores reference physical quantities in the first storage unit such as the RAM 11 which is directly readable/writable by the servo CPU 10 and the second storage unit such as the RAM 21 which is not directly readable/writable by the servo CPU 10 in detection of abnormality occurring in a movable part of an injection molding machine so as to detect abnormality of the movable part by using the reference physical quantities stored in these two storage units.

Abnormality detection of a movable part is performed based on both of the first physical quantity deviation which is calculated based on a current physical quantity detected from the movable part and a reference physical quantity stored in the first storage unit and the second physical quantity deviation which is calculated based on a current physical quantity detected from the movable part and a reference physical quantity stored in the second storage unit. The first storage unit is directly readable/writable by the servo CPU 10. Therefore, through abnormality detection which is performed by calculating the first physical quantity deviation which is a deviation between a reference physical quantity read by the servo CPU 10 from the first storage unit and a current physical quantity abnormality can be detected with almost no delay from the occurrence of the abnormality. Accordingly it is preferable that the servo CPU 10 perform processing for calculating the first physical quantity deviation.

The second storage unit is not directly readable/writable by the servo CPU 10. Therefore, it is necessary to transfer a reference physical quantity read from the second storage unit via another CPU which is capable of performing direct reading/writing with respect to the second storage unit, so as to calculate the second physical quantity deviation which is a deviation between the reference physical quantity read by the servo CPU 10 from the second storage unit and a current physical quantity. The processing for calculating the second physical quantity deviation may be performed by the servo CPU 10 or another CPU (the CNC CPU 20 in the case of use of the RAM 21 as the second storage unit, the PMC CPU 30 in the case of use of the RAM 31 as the second storage unit).

Here, as the way to detect a load of a movable part, a load may be detected by configuring a known disturbance load observer in a servo circuit or by preparing a detection unit such as a strain gauge in the movable part. Further, a load may be detected based on driving current of the servo motor 13. Alternatively, a load may be detected based on reduction of a speed of the servo motor 13 occurring when the load is applied in an inverted direction with respect to a traveling direction of the movable part and based on rise of the speed of the servo motor 13 occurring when the load is applied in the same direction with the traveling direction of the movable part. Alternatively, a load may be detected based on increase of a position deviation of the servo motor 13 occurring when the load is applied in the inverted direction with respect to the traveling direction of the movable part and based on decrease of the position deviation of the servo motor 13 occurring when the load is applied in the same direction with the traveling direction of the movable part.

Figure 4:
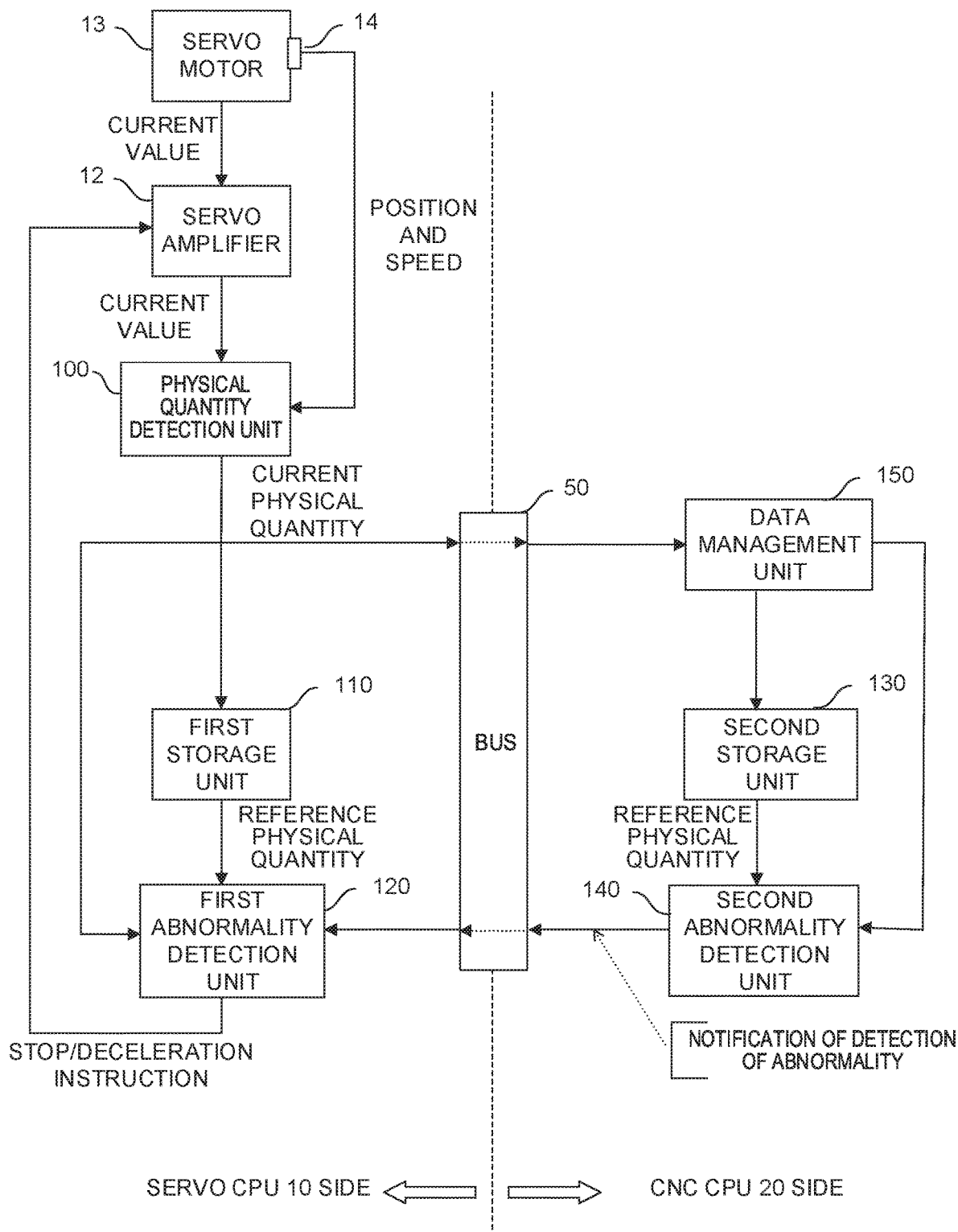
FIG. 4 s a schematic functional block diagram illustrating the abnormality detection device for injection molding machine according to the embodiment of the present invention.

FIG. 4 is a functional block diagram for explaining an operation for detecting abnormality of a movable part in the abnormality detection device 1 for injection molding machine having the configuration illustrated in FIG. 3. FIG. 4 illustrates a configuration example in which the RAM 11 in FIG. 3 is used as a first storage unit 110 and the RAM 21 in FIG. 3 is used as a second storage unit 130. The left side from the dotted center line of FIG. 4 shows an operation on the servo CPU 10 side and the right side from the dotted center line shows an operation on the CNC CPU 20 side. Further, a physical quantity detection unit 100 and a first abnormality detection unit 120 in FIG. 4 are functional means representing functions provided by respectively executing a system program of a physical quantity detection function and a system program of an abnormality detection function on the servo CPU 10. Further, a second abnormality detection unit 140 and a data management unit 150 are functional means representing functions provided by respectively executing a system program of an abnormality detection function and a system program of a data management function on the CNC CPU 20.

An operation of the abnormality detection device for injection molding machine according to the present embodiment will be described below in accordance with FIG. 4.

The physical quantity detection unit 100 detects a physical quantity such as a position or a speed of the servo motor 13 based on a feedback signal of a position from the position and speed detector 14 attached to the servo motor 13 and a current value of current for driving the servo motor 13. The physical quantity detected by the physical quantity detection unit 100 is stored in the first storage unit 110 and the second storage unit 130 and notified to the first abnormality detection unit 120 and the second abnormality detection unit 140. The storage of the physical quantity from the physical quantity detection unit 100 to the second storage unit 130 and the notification of the physical quantity to the second abnormality detection unit 140 are performed via the data management unit 150. The second abnormality detection unit 140 sequentially compares a current physical quantity notified from the physical quantity detection unit 100 with a reference physical quantity read from the second storage unit 130 in a manner to associate the current physical quantity and the reference physical quantity with elapsed time in which a movable part operates or an operation position of the movable part. In the case where a deviation obtained through the comparison exceeds a threshold value, the second abnormality detection unit 140 notifies the first abnormality detection unit 120 of abnormality In the case where the first abnormality detection unit 120 is notified of abnormality from the second abnormality detection unit 140 or in the case where a current physical quantity notified from the physical quantity detection unit 100 is sequentially compared with a reference physical quantity read from the first storage unit 110 in a manner that the current physical quantity and the reference physical quantity are associated with elapsed time in which a movable part operates or an operation position of the movable part and a deviation obtained through the comparison exceeds a threshold value, the first abnormality detection unit 120 notifies the servo amplifier 12 of an instruction for stopping or decelerating the movable part.

The embodiment of the present invention has been described above, but the present invention is not limited only to the example of the above-described embodiment but the present invention can be embodied in various aspects by making appropriate alterations.

For example, in one operation of a movable part, a physical quantity detected by the physical quantity detection unit 100 is stored in both of the first storage unit 110 and the second storage unit 130 from the start of the operation of the movable part to the maximum storage time (the maximum number of sampling points) in which storage can be performed in a storage region prepared in the first storage unit 110, while a physical quantity detected by the physical quantity detection unit 100 on and after the maximum storage time until the end of one operation of the movable part is stored in the second storage unit 130, in the above-described embodiment. However, in one operation of a movable part, a physical quantity detected by the physical quantity detection unit 100 may be stored only in the first storage unit 110 from the start of the operation of the movable part to the maximum storage time (the maximum number of sampling points) in which storage can be performed in a storage region prepared in the first storage unit 110, and a physical quantity detected by the physical quantity detection unit 100 on and after the maximum storage time until the end of the operation of the movable part may be stored in the second storage unit 130. In the case of this configuration, physical quantities detected from the start of the operation of the movable part to the maximum storage time (the maximum number of sampling points) may be checked based on reference physical quantities read from the first storage unit 110 by the first abnormality detection unit 120 (the servo CPU 10) and physical quantities detected on and after the maximum storage time may be checked based on reference physical quantities read from the second storage unit 130 by the second abnormality detection unit 140 (the CNC CPU 20), Further, in the above-described embodiment, a reference physical quantity obtained by associating a physical quantity detected in a past operation of a movable part with time from start of an operation of the movable part or a position coordinate of the movable part may be directly employed as a reference physical quantity to be stored in the first storage unit 110 and the second storage unit 130. However, as the technique disclosed in Japanese Patent Application Laid-Open No. 2001-030326 and Japanese Patent Application Laid-Open No. 2001-038775, such configuration may be employed that physical quantities for a plurality of times of past operations are stored so as to calculate a reference physical quantity based on the statistic (an average value or the like) calculated based on the physical quantities of a plurality of times of operations.

Further, the second abnormality detection unit 140 operates on the CNC CPU 20 side in the above description of the example of FIG. 4, but the second abnormality detection unit 140 may be allowed to operate on the servo CPU 10 side.

The embodiment of the present invention has been described thus far, but the present invention is not limited to the example of the above-described embodiment and may be embodied in other aspects by making appropriate alterations.

The invention claimed is:

1. An abnormality detection device for an injection molding machine, the abnormality detection device comprising:
   a servo CPU;
   a driving unit which drives and controls a servo motor based on an instruction from the servo CPU so as to drive a movable part;
   a physical quantity detection unit which detects any one of a load applied on the servo motor, a speed of the servo motor, a current flowing in the servo motor, and a position deviation of the servo motor, as a physical quantity; and
   first and second storage units which store a physical quantity in such a manner as to associate the physical quantity with the time that has elapsed during the operation of the movable part or the position of the movable part in the operation of the movable part, as a reference physical quantity, wherein the reference physical quantities which are stored in the first and second storage units, respectively, are sequentially compared with a physical quantity which is currently detected in such a manner that the reference and currently detected physical quantities are associated with the time that has elapsed during the operation of the movable part or the position of the movable part in the operation of the movable part, and thus, first and second physical quantity deviations are found so that an abnormality can be detected in the case where any physical quantity deviation exceeds a threshold value, the first storage unit is directly readable/writable by the servo CPU, the second storage unit is not directly readable/writable by the servo CPU, and the servo CPU outputs an instruction to stop or decelerate the movable part in the case where either a first physical quantity deviation which is a deviation between a reference physical quantity read from the first storage unit and a current physical quantity or a second physical quantity deviation which is a deviation between a reference physical quantity read from the second storage unit and a current physical quantity exceeds a threshold value.

2. The abnormality detection device according to claim 1, wherein the first storage unit has a smaller storage capacity or costs higher per unit storage capacity than the second storage unit.

3. The abnormality detection device according to claim 1, wherein the first storage unit is an internal RAM of the servo CPU or an external RAM which is connected with the servo CPU through a memory bus.

4. The abnormality detection device according to claim 1, wherein the first storage unit is configured to store the physical quantity detected by the physical quantity detection unit from a start of the operation of the movable part to a maximum storage time, and the second storage unit is configured to store the physical quantity detected by the physical quantity detection unit after the maximum storage time until an end of the operation of the movable part.

5. The abnormality detection device according to claim 1, further comprising:

a CNC (Computer Numerical Control) CPU configured to control the injection molding machine in accordance with an automatic operation program; and a PMC (Programmable Machine Control) CPU configured to control a sequence operation of the injection molding machine, wherein the servo CPU is configured to read/write on the second storage unit through the CNC CPU or the PMC CPU.

6. The abnormality detection device according to claim 1, wherein the servo CPU is configured to calculate the first physical quantity deviation based on the reference physical quantity stored in the first storage unit to detect the abnormality with no substantial delay from an occurrence of the abnormality, and the abnormality is detected, based on the second physical quantity deviation, with a delay from the occurrence of the abnormality.

7. The abnormality detection device according to claim 1, further comprising: a first abnormality detection unit and a second abnormality detection unit, wherein the first abnormality detection unit is configured to compare the current physical quantity notified from the physical quantity detection unit with the reference physical quantity read from the first storage unit in a manner that the current and reference physical quantities are associated with the time that has elapsed during the operation of the movable part or the position of the movable part in the operation of the movable part, to obtain the first physical quantity deviation, and the second abnormality detection unit is configured to compare the current physical quantity notified from the physical quantity detection unit with the reference physical quantity read from the second storage unit in a manner that the current and reference physical quantities are associated with the time that has elapsed during the operation of the movable part or the position of the movable part in the operation of the movable part, to obtain the second physical quantity deviation, the second abnormality detection unit is configured to notify the first abnormality detection unit of abnormality in response to the second physical quantity deviation exceeding the threshold value, and the first abnormality detection unit is configured to notify the servo amplifier of the instruction to stop or decelerate the movable part in response to any of (i) the first abnormality detection unit being notified of abnormality from the second abnormality detection unit and (ii) the first physical quantity deviation exceeding the threshold value.

* * * * *